US012799296B2

(12) United States Patent
Kim et al.

(10) Patent No.: US 12,799,296 B2
(45) Date of Patent: Nov. 17, 2026

(54) POLYESTER FILM AND METHOD FOR REPRODUCING POLYESTER CONTAINER USING SAME

(71) Applicants: SK microworks Co., Ltd., Gyeonggi-do (KR); Microworks America, Inc.

(72) Inventors: Chul Kyu Kim, Gyeonggi-do (KR); Yongdeuk Kim, Jeollanam-do (KR); Joo Ho Yang, Seoul (KR)

(73) Assignees: MICROWORKS AMERICA, INC., Covington, GA (US); MICROWORKS CO. LTD., Chungcheongbuk-Do (KR)

( * ) Notice: Subject to any disclaimer, the term of this patent is extended or adjusted under 35 U.S.C. 154(b) by 0 days.

(21) Appl. No.: 18/540,365

(22) Filed: Dec. 14, 2023

(65) Prior Publication Data

US 2024/0110031 A1 Apr. 4, 2024

Related U.S. Application Data

(63) Continuation of application No. 16/687,220, filed on Nov. 18, 2019, now abandoned.

(30) Foreign Application Priority Data

Oct. 29, 2019 (KR) ........................ 10-2019-0135643

(51) Int. Cl.
*C08J 11/06* (2006.01)
*B29B 17/04* (2006.01)
*B32B 27/36* (2006.01)

(52) U.S. Cl.
CPC ............... *C08J 11/06* (2013.01); *B29B 17/04* (2013.01); *B32B 27/36* (2013.01); *B29B 2017/0468* (2013.01); *B29B 2017/0476* (2013.01); *B32B 2519/00* (2013.01); *C08J 2367/02* (2013.01)

(58) Field of Classification Search
CPC ................ B29B 17/0026; B29B 17/04; B29B 17/0412; B29B 2017/0468; B29B 2017/0476; B29K 2067/00; B29K 2067/003; B29L 2007/00; B29L 2031/712; B32B 2250/02; B32B 2250/03; B32B 2250/244; B32B 2307/30; B32B 2307/40; B32B 2307/732; B32B 2307/736; B32B 2519/00; B32B 27/08; B32B 27/36; C08J 11/06; C08J 2367/02; Y02W 30/52; Y02W 30/62
See application file for complete search history.

(56) References Cited

U.S. PATENT DOCUMENTS

2019/0330442 A1* 10/2019 Shin et al.

FOREIGN PATENT DOCUMENTS

| | | | | | |
|---|---|---|---|---|---|
| JP | 2001058622 | A | * | 3/2001 | |
| JP | 2017052891 | A | * | 3/2017 | |
| KR | 20170090919 | A | * | 8/2017 | ............. B32B 27/36 |

OTHER PUBLICATIONS

Machine translation of JP 2001058622, Shibano et al., Mar. 6, 2001 (Year: 2001).*
KR-20170090919 translation (Year: 2017).*

* cited by examiner

*Primary Examiner* — Randy P Gulakowski
(74) *Attorney, Agent, or Firm* — IP&T GROUP LLP

(57) ABSTRACT

The embodiments relate to a polyester film and a process for regenerating a polyester container using the same, which not only solve the environmental problems by improving the recyclability of polyester containers, but also are capable of enhancing the yield and productivity. The polyester film comprises a first layer comprising a first resin comprising a diol component and a dicarboxylic acid component; and a second layer laminated on one side of the first layer and comprising a second resin different from the first resin, wherein when the polyester film is cut with a polyethylene terephthalate container to form flakes and the flakes are thermally treated at a temperature of 200° C. to 220° C. for 60 minutes to 120 minutes, the clumping fraction is 8% or less.

3 Claims, No Drawings

POLYESTER FILM AND METHOD FOR REPRODUCING POLYESTER CONTAINER USING SAME

CROSS-REFERENCE TO RELATED APPLICATION

The present application is a continuation of U.S. patent application Ser. No. 16/687,220 filed on Nov. 18, 2019, which claims the benefit of Korean Patent Application No. 10-2019-0135643, filed on Oct. 29, 2019, which is incorporated herein by reference in its entirety.

TECHNICAL FIELD

Embodiments relate to a polyester film and a process for regenerating a polyester container using the same, which not only solve the environmental problems by improving the recyclability of polyester containers, but also are capable of enhancing the yield and productivity.

BACKGROUND ART

As concerns about environmental problems have increased in recent years, there is a demand for addressing the recycling issues of products fabricated using thermoplastic polymers. In particular, polyethylene terephthalate, a thermoplastic resin having excellent properties in terms of thermal resistivity, processability, transparency, and non-toxicity, has been widely used for producing a wide range of products such as films, fibers, bottles, containers, and the like, and efforts have been made to improve the regeneration rate thereof.

In general, a polyolefin stretch film or the like is attached to a container produced from polyethylene terephthalate as a label. Thus, once a container recycled from the consumers has been washed and crushed, it is then subjected to liquid specific gravity separation, dehydration, drying, and/or wind specific gravity separation in order to remove a large amount of films contained in the crushed product and then to such an additional step as pelletization to obtain regenerated polyester chips. However, there has been a disadvantage in that the films are not completely removed even after the above steps; and that the regenerated polyester chips are colored due to the inks contained in the film, or they are non-uniformly clumped during the thermal treatment thereof.

Accordingly, a method of using a film made of a low specific gravity polymer such as polystyrene, polyethylene, polypropylene, and the like as a label has been proposed in order to readily carry out the specific gravity separation. However, the low specific gravity thereof cannot be effectively achieved due to the ink layer, which makes it difficult to completely separate the films, and the problem that the residual ink colors the regenerated chips cannot be solved.

DISCLOSURE OF INVENTION

Technical Problem

Accordingly, embodiments aim to provide a polyester film capable of preventing the clumping caused by residual ink during the regeneration process, thereby improving the recyclability of a polyester container, and a process for regenerating the polyester container using the same.

Solution to Problem

According to an embodiment, there is provided a polyester film, which comprises a first layer comprising a first resin comprising a diol component and a dicarboxylic acid component; and a second layer laminated on one side of the first layer and comprising a second resin different from the first resin, wherein when the polyester film is cut with a polyethylene terephthalate container to form flakes and the flakes are thermally treated at a temperature of 200° C. to 220° C. for 60 minutes to 120 minutes, the clumping fraction is 8% or less.

According to another embodiment, there is provided a process for regenerating a polyester container, which comprises providing the polyester container and a heat-shrunken polyester film that wraps at least part of the polyester container; crushing the polyester container and the heat-shrunken polyester film to obtain flakes; and thermally treating the flakes to produce regenerated polyester chips, wherein when the flakes are thermally treated at a temperature of 200° C. to 220° C. for 60 minutes to 120 minutes, the clumping fraction is 8% or less, the flakes comprise first flakes obtained by crushing the container and second flakes obtained by crushing the heat-shrunken polyester film, and the heat-shrunken polyester film comprises a first layer comprising a first resin comprising a diol component and a dicarboxylic acid component; and a second layer laminated on one side of the first layer and comprising a second resin different from the first resin.

According to still another embodiment, there are provided regenerated polyester chips produced by the process for regenerating a polyester container.

Advantageous Effects of Invention

The polyester film according to the embodiments improves the recyclability of a polyester container, thereby solving the environmental problems, and enhances the yield and productivity.

In addition, the process for regenerating a polyester container according to the embodiment does not require a separate step of separating the polyester container and a film. Thus, it is economical since time and cost are saved.

BEST MODE FOR CARRYING OUT THE INVENTION

Hereinafter, the present invention will be described in detail with reference to embodiments. The embodiments are not limited to those described below. Rather, they can be modified into various forms as long as the gist of the invention is not altered.

Throughout the present specification, when a part is referred to as "comprising" an element, it is understood that other elements may be comprised, rather than other elements are excluded, unless specifically stated otherwise.

All numbers and expressions relating to quantities of components, reaction conditions, and the like used herein are to be understood as being modified by the term "about" unless specifically stated otherwise.

Throughout the present specification, the terms first, second, and the like are used to describe various components. But the components should not be limited by the terms. The terms are used only for the purpose of distinguishing one component from another.

Polyester Film

According to an embodiment, there is provided a polyester film, which comprises a first layer comprising a first resin comprising a diol component and a dicarboxylic acid component; and a second layer laminated on one side of the first layer and comprising a second resin different from the first resin, wherein when the polyester film is cut with a polyethylene terephthalate container to form flakes and the flakes are thermally treated at a temperature of 200° C. to 220° C. for 60 minutes to 120 minutes, the clumping fraction is 8% or less.

First Layer

According to an embodiment, the first resin comprises a diol component and a dicarboxylic acid component.

According to an embodiment, the diol component may be composed of a linear or branched $C_2$ to $C_{10}$ diol. That is, the diol component may not comprise an alicyclic diol or an aromatic diol.

For example, the linear or branched $C_2$ to $C_{10}$ diol may comprise ethylene glycol, diethylene glycol, neopentyl glycol, 1,3-propanediol, 1,2-octanediol, 1,3-octanediol, 2,3-butanediol, 1,3-butanediol, 1,4-butanediol, 1,5-pentanediol, 2-butyl-2-ethyl-1,3-propanediol, 2,2-diethyl-1,5-pentanediol, 2,4-diethyl-1,5-pentanediol, 3-methyl-1,5-pentanediol, 1,1-dimethyl-1,5-pentanediol, 1,6-hexanediol, 2-ethyl-3-methyl-1,5-hexanediol, 2-ethyl-3-ethyl-1,5-hexanediol, 1,7-heptanediol, 2-ethyl-3-methyl-1,5-heptanediol, 2-ethyl-3-ethyl-1,6-heptanediol, 1,8-octanediol, 1,9-nonanediol, 1,10-decanediol, a derivative thereof, or any combination thereof. But it is not limited thereto.

According to an embodiment, the diol component may comprise at least one selected from the group consisting of ethylene glycol, diethylene glycol, cyclohexanedimethanol (CHDM), propanediol unsubstituted or substituted with an alkyl group, butanediol unsubstituted or substituted with an alkyl group, pentanediol unsubstituted or substituted with an alkyl group, hexanediol unsubstituted or substituted with an alkyl group, octanediol unsubstituted or substituted with an alkyl group, and a combination thereof.

According to an embodiment, the diol component may comprise ethylene glycol, diethylene glycol, 1,4-cyclohexanedimethanol, 1,3-propanediol, 1,2-octanediol, 1,3-octanediol, 2,3-butanediol, 1,3-butanediol, 1,4-butanediol, 1,5-pentanediol, neopentyl glycol, 2-butyl-2-ethyl-1,3-propanediol, 2,2-diethyl-1,5-pentanediol, 2,4-diethyl-1,5-pentanediol, 3-methyl-1,5-pentanediol, 1,1-dimethyl-1,5-pentanediol, or a combination thereof.

According to an embodiment, the diol component may be at least one selected from the group consisting of ethylene glycol, diethylene glycol, neopentyl glycol, and cyclohexanedimethanol.

According to an embodiment, the first resin may comprise ethylene glycol in an amount of 60 to 90% by mole based on the total number of moles of the diol component. For example, the first resin may comprise ethylene glycol in an amount of 65 to 90% by mole, 65 to 85% by mole, or 70 to 80% by mole, based on the total number of moles of the diol component. If the above range is satisfied, the heat shrinkage rate of a film thus prepared can be adjusted to a proper level, and the clumping fraction in the subsequent regeneration step can be reduced.

According to an embodiment, the first resin may comprise diethylene glycol or cyclohexanedimethanol in an amount of 10 to 50% by mole based on the total number of moles of the diol component. For example, the first resin may comprise diethylene glycol or cyclohexanedimethanol in an amount of 15 to 45% by mole, 20 to 40% by mole, or 25 to 35% by mole, based on the total number of moles of the diol component. If the above range is satisfied, the heat shrinkage rate of a film thus prepared can be adjusted to a proper level, and the clumping fraction in the subsequent regeneration step can be reduced.

According to an embodiment, the first resin may comprise neopentyl glycol in an amount of 10 to 50% by mole based on the total number of moles of the diol component. For example, the first resin may comprise neopentyl glycol in an amount of 15 to 45% by mole, 20 to 40% by mole, or 25 to 35% by mole, based on the total number of moles of the diol component. If the above range is satisfied, a polyester film having a heat shrinkage rates in a first direction and in a second direction perpendicular to the first direction that are not high even at a high temperature can be prepared. In particular, if the content of neopentyl glycol exceeds the above range, the film may excessively expand in the second direction as compared with the first direction, so that wrinkles or deformation may occur when the film is applied to a container. In addition, if the content of neopentyl glycol is less than the above range, the amorphous region becomes large, whereby the expansion coefficient would be increased due to the low shrinkage characteristics in the second direction although the shrinkage characteristics in the first direction could be improved.

In this specification, the first direction is the main shrinkage direction, which may be the transverse direction or the longitudinal direction. Specifically, the first direction may be the transverse direction, and the second direction that is perpendicular to the first direction may be the longitudinal direction. Alternatively, the first direction may be the longitudinal direction, and the second direction that is perpendicular to the first direction may be the transverse direction.

According to another embodiment, the first resin may further comprise a monohydric alcohol in addition to the diol component. For example, the monohydric alcohol may be methanol, ethanol, isopropyl alcohol, allyl alcohol, or benzyl alcohol. Specifically, the first resin may comprise a monohydric alcohol in an amount of 10 to 30% by mole, 13 to 25% by mole, or 15 to 22% by mole, based on the total number of moles of the diol component and the monohydric alcohol. But it is not limited thereto.

The dicarboxylic acid component may be selected from the group consisting of an aromatic dicarboxylic acid such as terephthalic acid, dimethylterephthalic acid, isophthalic acid, naphthalene dicarboxylic acid, orthophthalic acid, and the like; an aliphatic dicarboxylic acid such as adipic acid, azelaic acid, sebacic acid, decanedicarboxylic acid, and the like; an alicyclic dicarboxylic acid; an ester thereof; and a combination thereof. Specifically, the dicarboxylic acid component may be composed of terephthalic acid, dimethyl terephthalic acid, isophthalic acid, naphthalene dicarboxylic acid, orthophthalic acid, or a combination thereof.

According to an embodiment, the dicarboxylic acid component may comprise an aromatic dicarboxylic acid. For example, the dicarboxylic acid component may comprise at least 80% by mole, at least 90% by mole, or at least 95% by mole of terephthalic acid, dimethyl terephthalic acid, or isophthalic acid, based on the total number of moles of the dicarboxylic acid component.

The dicarboxylic acid component and the diol component as described above are subjected to a transesterification reaction and then polymerization to thereby form a first resin. Specifically, at least one catalyst selected from manganese acetate, calcium acetate, and zinc acetate may be used as a catalyst for the transesterification reaction. The content of the catalyst may be 0.02 to 0.2% by weight based on the total weight of the dicarboxylic acid compound. Upon completion of the transesterification reaction, at least one additive selected from silica, potassium, and magnesium; a stabilizer such as trimethyl phosphate; a polymerization catalyst selected from antimony trioxide and tetrabutylene titanate; and the like may be selectively added to carry out the reaction, to thereby prepare a first resin composition.

According to an embodiment, the thickness of the first layer may be 10 μm to 100 lam. For example, the thickness of the first layer may be 20 μm to 90 μm or 30 μm to 80 rim. If the above range is satisfied, the shrinkage uniformity and printability is excellent.

Second Layer

According to an embodiment, the second layer is laminated on one side of the first layer and comprises a second resin different from the first resin.

According to an embodiment, the second resin may comprise a resin having a weight average molecular weight of less than 10,000 or a resin having a weight average molecular weight of greater than 12,000. Specifically, according to an embodiment, a resin having a weight average molecular weight of less than 10,000 or a resin having a weight average molecular weight of greater than 12,000 may be used as the second resin. Alternatively, a resin having a weight average molecular weight of less than 10,000 and a resin having a weight average molecular weight of greater than 12,000 may be used together as the second resin. For example, the second resin may be a polyethylene naphthalate-based resin.

According to an embodiment, when the second layer is laminated on the first layer with an organic solvent, the bonding force of the laminated portion may be 600 gf or more. Specifically, when a first polyester film in which the first layer and the second layer are laminated and a second polyester film in which the first layer and the second layer are laminated are laminated with an organic solvent, the bonding force of the laminated portion may be 620 gf or more, 650 gf or more, 700 gf or more, 750 gf or more, 800 gf or more, 840 gf or more, 600 to 1,800 gf, 750 to 1,800 gf, or 800 to 1,500 gf. The organic solvent may be tetrahydrofuran, but it is not limited thereto.

A polyester film comprises a two-component material such as neopentyl glycol, diethylene glycol, and the like in order to achieve the properties required as a heat shrinkable film. In such event, the stretching crystallization is induced in the stretching step during the film preparation process due to the chemical resistance of the material, which increases the crystallinity of the polymer that constitutes the film, resulting in a problem that the adhesion is deteriorated by the organic solvent at the time of heat setting at high temperatures.

However, in the polyester film according to the embodiment, which comprises a second layer comprising a second resin comprising a resin having a weight average molecular weight of less than 10,000 or a resin having a weight average molecular weight of greater than 12,000, the bonding force between the films can be enhanced.

The organic solvent may be tetrahydrofuran, but it is not limited thereto.

According to an embodiment, the thickness of the second layer may be 10 nm to 100 μm. For example, the thickness of the second layer may be 20 nm to 90 μm or 30 nm to 80 μm. If the above range is satisfied, the shrinkage uniformity and printability is excellent.

Third Layer

According to an embodiment, a third layer may be laminated on the other side of the first layer and comprise a third resin different from the first resin.

According to an embodiment, the third resin may comprise a resin having a weight average molecular weight of less than 10,000 or a resin having a weight average molecular weight of greater than 12,000. Specifically, a resin having a weight average molecular weight of less than 10,000 or a resin having a weight average molecular weight of greater than 12,000 may be used as the third resin. Alternatively, a resin having a weight average molecular weight of less than 10,000 and a resin having a weight average molecular weight of greater than 12,000 may be used together as the third resin.

According to an embodiment, the second resin and the third resin may be the same as each other. Specifically, the third resin may be a polyethylene naphthalate-based resin.

According to an embodiment, when the second layer is laminated on the third layer with an organic solvent, the bonding force of the laminated portion may be 200 gf or more. Specifically, when a first polyester film in which the second layer, the first layer, and the third layer are laminated in order and a second polyester film in which the second layer, the first layer, and the third are laminated in order are laminated with an organic solvent, the bonding force of the laminated portion may be 250 gf or more, 280 gf or more, 300 gf or more, 350 gf or more, 400 gf or more, 420 gf or more, 450 gf or more, 200 to 1,000 gf, 250 to 1,000 gf, 300 to 1,000 gf, 350 to 1,000 gf, 400 to 1,000 gf, or 450 to 900 gf.

As described above, in the polyester film according to the embodiment, which comprises the second layer comprising the second resin and the third layer comprising the third resin, the bonding force between the films can be enhanced.

According to an embodiment, the thickness of the third layer may be 10 nm to 100 lam. For example, the thickness of the third layer may be 20 nm to 90 μm or 30 nm to 80 μm. If the above range is satisfied, the shrinkage uniformity and printability is excellent.

According to an embodiment, the polyester film may have a heat shrinkage rate of 30% or more in the first direction upon thermal treatment at a temperature of 80° C. for seconds. For example, the polyester film may have a heat shrinkage rate of 35% or more, 40% or more, 45% or more, 50% or more, 30% to 85%, 40% to 80%, or 50% to 80%, in the first direction upon thermal treatment at a temperature of 80° C. for 10 seconds. If the above range is satisfied, it is easy to attach and label the polyester film on the surface of a container.

According to an embodiment, the polyester film may have a heat shrinkage rate of 50% or more in the first direction upon thermal treatment at a temperature of 90° C. for seconds. For example, the polyester film may have a heat shrinkage rate of 55% or more, 60% or more, 70% or more, 50% to 90%, 60% to 85%, 70% to 85%, or 70% to 80%, in the first direction upon thermal treatment at a temperature of 90° C. for 10 seconds. If the above range is satisfied, it is easy to attach and label the polyester film on the surface of a container.

According to an embodiment, the polyester film may have a heat shrinkage rate of 5% to 55% in the first direction upon thermal treatment at a temperature of 70° C. for 10 seconds. For example, the polyester film may have a heat shrinkage rate of 5% to 50%, 10% to 50%, 20% to 45%, or 25% to 40%, in the first direction upon thermal treatment at a temperature of 70° C. for 10 seconds. If the above range is satisfied, it is easy to attach and label the polyester film on the surface of a container.

According to an embodiment, the polyester film may have a heat shrinkage rate of 30% or more in the first direction upon thermal treatment at a temperature of 100° C. for seconds. For example, the polyester film may have a heat shrinkage rate of 35% or more, 40% or more, 50% or more, 30% to 90%, 30% to 80%, 40% to 80%, 45% to 80%, or 50% to 80%, in the first direction upon thermal treatment at a temperature of 100° C. for 10 seconds. If the above range is satisfied, it is easy to attach and label the polyester film on the surface of a container.

According to an embodiment, the polyester film has a melting point (Tm) of 170° C. or higher as measured by differential scanning calorimetry. For example, the polyester film may have a melting point of 170° C. or higher, 175° C. or higher, specifically 170° C. to 230° C., 170° C. to 200° C., or 175° C. to 200° C., as measured by differential scanning calorimetry. If the above range is satisfied, the clumping fraction in the subsequent regeneration step can be reduced.

According to an embodiment, the crystallization temperature (Tc) of the polyester film is not measured or is 70° C. to 130° C. by differential scanning calorimetry. For example, the crystallization temperature (Tc) of the polyester film is not measured or may be 70° C. to 120° C., 75° C. to 110° C., or 80° C. to 110° C. by differential scanning calorimetry. If the above range is satisfied, the clumping fraction in the subsequent regeneration step can be reduced.

According to an embodiment, the heat of crystallization of the polyester film may be 0.01 to 50 J/g as measured at the crystallization temperature (Tc). For example, the heat of crystallization of the polyester film may be 0.01 to 40 J/g, 0.05 to 30 J/g, 0.1 to J/g, 0.1 to 10 J/g, 0.1 to 8 J/g, or 0.1 to 5 J/g, as measured at the crystallization temperature (Tc). If the above range is satisfied, the clumping fraction in the subsequent regeneration step can be reduced.

Specifically, if the melting point (Tm) of the polyester film is 170° C. or higher and the crystallization temperature (Tc) is 70° C. to 130° C. as measured by differential scanning calorimeter, the effect of reducing the clumping fraction can be the most excellent.

According to an embodiment, the polyester film may have a haze of 10% or less. For example, the haze of the polyester film may be 8% or less, 7% or less, or 5% or less.

According to an embodiment, the polyester film may have a thickness of 10 μm to 100 μm. For example, the thickness of the polyester film may be 20 μm to 90 μm or 30 lam to 100 μm.

Specifically, if the polyester film is formed by a coating method, the thickness of the polyester film may be 10 μm to 100 μm or 20 μm to 90 μm, and if the polyester film is formed by coextrusion, it may be 10 μm to 100 μm or 20 μm to 90 μm. If the above range is satisfied, the shrinkage uniformity and printability is excellent.

Process for Preparing a Polyester Film

According to an embodiment, a polyester film may be prepared from the first resin and the second resin.

Specifically, the process may comprise (a) preparing a sheet in which a first layer and a second layer are laminated from the first resin and the second resin; (b) stretching the laminated sheet in at least one of a first direction and a second direction perpendicular to the first direction; (c) heat setting the stretched sheet; and (d) relaxing the heat-set sheet.

In addition, the process may comprise (a) preparing a sheet in which a first layer to a third layer are laminated from the first resin to the third resin; (b) stretching the laminated sheet in at least one of a first direction and a second direction perpendicular to the first direction; (c) heat setting the stretched sheet; and (d) relaxing the heat-set sheet.

Step (a)

According to an embodiment, a sheet in which a first layer and a second layer are laminated may be prepared. Specifically, the first resin and the second resin are melt extruded through an extruder, or the first resin is melt extruded, followed by coating of the second resin, which is then dried to prepare a sheet in which the first layer and the second layer are laminated. More specifically, the sheet prepared in the above step (a) may be prepared by co-extruding each of the first resin and the second resin, or extruding the first resin, which is then subjected to a coating step, to prepare a sheet in which the first layer and the second layer are laminated. The co-extrusion or coating step may be carried out by a conventional step.

According to another embodiment, a sheet in which a first layer to a third layer are laminated may be prepared. For example, a sheet in which the second layer, the first layer, and the third layer are laminated in order may be prepared. Specifically, the first resin is melt extruded, followed by coating of the second resin and the third resin, which is then dried to prepare a sheet in which the first layer to the third layer are laminated. More specifically, the sheet prepared in the above step (a) may be prepared by co-extruding each of the first resin to the third resin, or extruding the first resin, which is then subjected to a coating step to prepare a sheet in which the second layer and the third layer are laminated. The co-extrusion or coating step may be carried out by a conventional step.

The melt-extrusion may be carried out at a temperature of 260° C. to 300° C. or 270° C. to 290° C. The first resin to the third resin, which are melt extruded, may be laminated through a multilayer feed block to form a sheet. Alternatively, the first resin to the third resin may be extruded through extruders, respectively, to a plurality of layers, which, as laminated, is then led to a T-die to form a sheet.

According to an embodiment, the formation and lamination of the first layer to the third layer may be carried out simultaneously through co-extrusion.

According to an embodiment, in the sheet prepared in the above step (a), the first layer and the second layer may be alternately laminated, or the second layer, the first layer, and the third layer may be repeatedly laminated in order.

Step (b)

According to an embodiment, in the above step (b), a step of stretching the sheet may be carried out in at least one of a first direction and a second direction perpendicular to the first direction.

Specifically, the sheet may be preheated at 90° C. to 140° C. for 0.01 minute to 1 minute before the stretching. For example, the preheating temperature (T1) may be 95° C. to 115° C. or 97° C. to 113° C., and the preheating time may be 0.05 minute to 0.5 minute or 0.08 minute to 0.2 minute. But they are not limited thereto.

The stretching may be carried out by biaxial stretching. For example, it may be carried out in a first direction and in a second direction through a simultaneous biaxial stretching method or a sequential biaxial stretching method. Preferably, it may be carried out by a sequential biaxial stretching method in which stretching is first performed in one direction and then stretching is performed in the direction perpendicular thereto. For example, the sheet may be stretched in a first direction and then stretched in a second direction.

According to an embodiment, the stretching may be carried out in a first direction or in a second direction perpendicular to the first direction. For example, the stretching may be carried out in a first direction and then in a second direction. Specifically, the stretching may be carried out at a temperature lower than the preheating temperature (T1) by at least 20° C. in a first direction or in a second direction perpendicular to the first direction by 3 to 5 times. For example, the stretching may be carried out at a stretching temperature of 60° C. to 120° C., 60° C. to 90° C., 70°

C. to 90° C., or 80° C. to 90° C., in a first direction or in a second direction perpendicular to the first direction by 3 to 4.5 times, 3.5 to 4.5 times, or 4 to 4.5 times. But it is not limited thereto.

Step (c)

According to an embodiment, in the above step (c), the stretched sheet may be heat set.

Specifically, the heat setting may be annealing and carried out at 70° C. to 95° C. for 0.01 minute to 1 minute. For example, the heat setting temperature (T2) may be 75° C. to 95° C. or 75° C. to 90° C., and the heat setting time may be 0.05 minute to 0.5 minute or 0.08 minute to 0.2 minute. But they are not limited thereto.

According to an embodiment, the preheating temperature (T1)—the heat setting temperature (T2) may be 10° C. to 50° C. For example, T1-T2 may be 13° C. to 35° C., 10° C. to 34° C., 15° C. to 34° C., 10° C. to 46° C., or 20° C. to 46° C. If the above range is satisfied, the heat shrinkage rates in the first direction and in the second direction may be effectively controlled.

Step (d)

According to an embodiment, in the above step (d), the heat-set sheet may be relaxed. Specifically, the heat-set sheet may be relaxed in a first direction or in a second direction perpendicular to the first direction.

The relaxation may be carried out at a relaxation rate of 0.1% to 10%, 0.5% to 8%, 1% to 5%, or 1% to 3%. In addition, the relaxation may be carried out for 1 second to 1 minute, 2 seconds to 30 seconds, or 3 seconds to 10 seconds.

Process for Regenerating a Polyester Container

According to another embodiment, there is provided a process for regenerating a polyester container, which comprises providing the polyester container and a heat-shrunken polyester film that wraps at least part of the polyester container; crushing the polyester container and the heat-shrunken polyester film to obtain flakes; and thermally treating the flakes to produce regenerated polyester chips, wherein when the flakes are thermally treated at a temperature of 200° C. to 220° C. for 60 minutes to 120 minutes, the clumping fraction is 8% or less, the flakes comprise first flakes obtained by crushing the container and second flakes obtained by crushing the heat-shrunken polyester film, and the heat-shrunken polyester film comprises a first layer comprising a first resin comprising a diol component and a dicarboxylic acid component; and a second layer laminated on one side of the first layer and comprising a second resin different from the first resin.

According to an embodiment, the polyester film may be laminated on the other side of the first layer and may comprise a third layer comprising a third resin different from the first resin. Details on the first resin to the third resin are as described above.

In order to regenerate a polyester container according to an embodiment, the polyester container with a heat-shrunken polyester film that wraps at least part of the polyester container is provided (step (1)).

Details on the Polyester Film are as Described Above.

In the polyester container, the heat-shrunken polyester film may be provided on the outer surface of the polyester container. Specifically, the outer surface of the polyester container is covered with the polyester film, and the polyester film may be shrunken by steam or hot air to wrap at least part of the outer surface of the polyester container. In such event, the polyester film may have an ink layer formed by a process such as printing before the heat shrinkage.

In general, recycled waste products are intermingled with containers, metals, glass, plastics, and the like. Once the waste products are washed, polyester containers are classified. Then, the polyester container may be subject to a process in which the film covering the container is mechanically torn or cut to be removed. Alternatively, once the polyester container has been washed and crushed, it is then subjected to liquid specific gravity separation, dehydration, drying, and/or wind specific gravity separation, followed by such an additional step as pelletization. In such event, the quality of the regenerated polyester chips to be produced may be deteriorated due to the residual film and the ink layer formed on the residual film.

In contrast, it is possible to produce regenerated polyester chips from a polyester container wrapped with a heat-shrunken polyester film according to the embodiment even without an additional process of removing a film. Thus, it is economical since time and cost are saved.

According to an embodiment, the polyester container may comprise at least 90% by weight of a polyester resin based on the total weight of the polyester container. Specifically, the polyester container may be a container that comprises polyethylene terephthalate (PET) and may comprise polyethylene terephthalate in an amount of 90% by weight or more, 95% by weight or more, or 99% by weight or more, based on the total weight of the polyester container. But it is not limited thereto.

Thereafter, the polyester container and the heat-shrunken polyester film are crushed to obtain flakes (step (2)).

In the polyester container, at least part of the surface of the polyester container is wrapped by the heat-shrunken polyester film. The polyester container and the film are crushed to obtain flakes. Specifically, the flakes comprise first flakes obtained by crushing the polyester container and second flakes obtained by crushing the polyester film.

According to an embodiment, the particle size of the first flakes may be 0.1 to 25 mm, and the particle size of the second flakes may be 0.1 to 25 mm. For example, the particle size of the first flakes may be 0.3 to 23 mm, 0.5 to 20 mm, 1 to 20 mm, 0.5 to 15 mm, 0.5 to 13 mm, 1 to 18 mm, 1 to 15 mm, 1 to 13 mm, or 2 to 10 mm. The particle size of the second flakes may be 0.3 to 23 mm, 0.5 to 20 mm, 1 to 20 mm, 0.5 to 15 mm, 0.5 to 13 mm, 1 to 18 mm, 1 to 15 mm, 1 to 13 mm, or 2 to 10 mm. But they are not limited thereto.

According to an embodiment, the flakes may be immersed in a 0.5% to 3% aqueous solution of NaOH for 5 minutes to 30 minutes to be cleaned. For example, the first flakes and second flakes may be immersed in a 0.5% to 2.5% or 0.5% to 1.5% aqueous solution of NaOH for 5 minutes to 25 minutes or 10 minutes to 20 minutes to be cleaned. Impurities remaining in the flakes during the process may be removed by carrying out the cleaning step.

According to an embodiment, the flakes may be washed after the cleaning step. For example, the flakes may be washed with water at room temperature or a 0.5% to 3% aqueous solution of NaOH at 80° C. to 97° C. for 5 minutes to 30 minutes. A part or all of the ink layer remaining in the flakes may be removed by carrying out the washing step.

According to an embodiment, the flakes may be dried at 60° C. to 175° C. for 10 minutes to 30 minutes after the washing step. For example, the flakes may be dried at 60° C. to 175° C., 70° C. to 170° C., or 80° C. to 160° C. for 10 minutes to 30 minutes, 10 minutes to 25 minutes, or 15 minutes to 30 minutes after the washing step.

The cleaning, washing, and drying steps may be carried out once to five times repeatedly. Specifically, the impurities and ink layer remaining in the flakes can be effectively removed by repeatedly carrying out the cleaning, washing, and drying steps two to five times or three to five times.

Finally, the flakes are thermally treated to produce regenerated polyester chips (step (3)).

The thermal treatment may be carried out at 200° C. to 220° C. for 60 minutes to 120 minutes. For example, the thermal treatment may be carried out at 200° C. to 215° C. or 205° C. to 220° C. for 70 minutes to 120 minutes or 80 minutes to 120 minutes.

Regenerated polyester chips that comprise the flakes may be obtained after the thermal treatment step. Specifically, regenerated polyester chips that comprise the first flakes and the second flakes may be obtained. For example, the flakes may be melt-extruded and cut to obtain regenerated polyester chips.

Regenerated Polyester Chips

According to an embodiment, the regenerated polyester chips may have an intrinsic viscosity (IV) of 0.60 dl/g or more. For example, the regenerated polyester chips may have an intrinsic viscosity (IV) of 0.63 dl/g or more, 0.65 dl/g or more, 0.70 dl/g or more, 0.75 dl/g or more, 0.60 to 3.00 dl/g, 0.60 to 2.0 dl/g, or 0.65 to 1.0 dl/g.

According to an embodiment, when the flakes are thermally treated at a temperature of 200° C. to 220° C. for 60 minutes to 120 minutes, the clumping fraction may be 8% or less.

The clumping refers to an aggregate that may be formed from the flakes. The size of the aggregate may be, for example, at least three times the size of the flake particles. The clumping fraction refers to the fraction of the aggregates based on the total weight of the flakes. For example, the flakes may be passed through a sieve and thermally treated. At that time, aggregates may be formed as the flakes are clumped. The aggregates may be passed through a sieve again to be separated. The weight of the aggregates thus obtained is measured to calculate the weight ratio of the aggregates based on the total weight of the thermally treated flakes as the clumping fraction.

Thus, the higher the value of the crumbling fraction is, the more the first flakes and the second flakes are entangled together to lower the quality of the regenerated chips. However, the second flakes are obtained by crushing the polyester film according to the embodiment, thereby effectively reducing or preventing the formation of aggregates and enhancing the quality of the regenerated polyester chips.

MODE FOR THE INVENTION

Hereinafter, the present invention will be described in more detail with reference to the following examples. However, these examples are set forth to illustrate the present invention, and the scope of the present invention is not limited thereto.

EXAMPLE

Example 1

Preparation of a First Resin

A stainless steel autoclave equipped with a stirrer, a thermometer, and a partial reflux condenser was charged with 100% by mole of terephthalic acid (TA) as a dicarboxylic acid component and 70% by mole of ethylene glycol (EG) and 30% by mole of cyclohexanedimethanol (CHDM) as a diol component. Then, 0.05% by mole (based on the acid component) of zinc acetate as a transesterification catalyst was added thereto. The transesterification reaction was carried out while methanol was being distilled off. Thereafter, 0.025% by mole (based on the acid component) of antimony trioxide as a polycondensation catalyst was added, and the polycondensation reaction was carried out under a reduced pressure of 26.6 Pa (0.2 Torr) at 280° C. to obtain a first resin.

Preparation of a Polyester Film

The first resin was fed to an extruder and then melt-extruded at 280° C. through a T-die, which was cooled. A second resin (PEN 1: polyethylene naphthalate-based resin having a weight average molecular weight of greater than 12,000, Z-690, manufacturer: GOO Chemical) was applied on to the first resin, which was dried to obtain an unstretched sheet. Then, the unstretched sheet was passed through rolls at 75° C. to be stretched by 3.0 to 3.9 times while it was conveyed at a speed of 55 m/min and then preheated at 100° C. to 110° C. for 0.1 minute. Thereafter, the sheet was stretched 4.0 to 4.7 times in the transverse direction at 85° C. and then heat set at 90° C. for 0.1 minute to obtain a polyester film having a thickness of 40 μm. Here, the thickness of the second layer was 20 μm.

Preparation of a Polyester Container Wrapped with a Polyester Film

The outer surface of a polyethylene terephthalate container (PET container, 30 g) was wrapped with the polyester film (1 g) prepared above using an acrylate-based adhesive. The polyester film was shrunken in hot air at a temperature of 90° C. to obtain a polyester container wrapped with a heat-shrunken polyester film.

Process for Regenerating a Polyester Container

The container wrapped with the polyester film was crushed with a crusher to obtain flakes. The flakes were washed with water and then washed for 15 minutes with a corrosion washing solution (a mixture of a solution of 0.3% by weight of Triton X-100 and a solution of 1.0% by weight of NaOH) stirred in a bath at 85° C. to 90° C. at 880 rpm. Thereafter, the flakes were washed with water at room temperature to remove the residual corrosion washing solution, dried at 160° C. for 20 minutes, and then thermally treated at 210° C. to produce regenerated polyester chips.

Examples 2 to 9 and Comparative Example 1

Regenerated polyester chips were prepared in the same manner as in Example 1, except that the components and contents were changed as shown in Table 1 below and that the first resin and the second resin or the first resin to the third resin were co-extruded through respective extruders and laminated in Examples 2, 4, 7, and 9. The same resin was used for the second resin and the third resin.

TABLE 1

| | No. of laminations | First layer (% by mole) | Second layer and third layer: Process | Thickness (μm) | Resin | |
|---|---|---|---|---|---|---|
| Ex. 1 | 2 layers | NPG (30% by mole), EG (70% by mole) | Coating | 20 | PEN 1 (100%) | — |
| Ex. 2 | | CHDM (30% by mole), EG (70% by mole) | Co-extrusion | 20 | PEN 1 (100%) | — |
| Ex. 3 | | NPG (30% by mole), EG (70% by mole) | Coating | 20 | PEN 1 (40%) | PEN 2 (60%) |
| Ex. 4 | | CHDM (30% by mole), EG (70% by mole) | Co-extrusion | 20 | PEN 1 (60%) | PEN 2 (40%) |
| Ex. 5 | | CHDM (30% by mole), EG (70% by mole) | Coating | 20 | — | PEN 2 (100%) |
| Ex. 6 | 3 layers | NPG (30% by mole), EG (70% by mole) | Coating | 20 | PEN 1 (100%) | — |
| Ex. 7 | | CHDM (30% by mole), EG (70% by mole) | Co-extrusion | 20 | PEN 1 (100%) | — |
| Ex. 8 | | NPG (30% by mole), EG (70% by mole) | Coating | 20 | PEN 1 (40%) | PEN 2 (60%) |
| Ex. 9 | | CHDM (30% by mole), EG (70% by mole) | Co-extrusion | 20 | PEN 1 (60%) | PEN 2 (40%) |
| C. Ex. 1 | Single layer | CHDM (30% by mole), EG (70% by mole) | — | — | — | — |

* 2-layer laminated structure: first layer/second layer
* 3-layer laminated structure: third layer/first layer/second layer
* PEN 2: polyethylene naphthalate-based resin having a weight average molecular weight of less than 10,000 (Z-760, manufacturer: GOO Chemical)

Test Example 1: Measurement of Clumping

The flakes prepared above were passed through a 0.625"-sieve. 1 kg of the flakes thus sieved (in which the first flakes and the second flakes were mixed at a ratio of 97:3) was exposed in an oven at 210° C. for 90 minutes. The flakes were cooled to room temperature and passed through a 0.625"-sieve. The weight of the aggregates thus filtered out was measured and calculated as a percentage of the total weight of the flakes.

Test Example 2: Measurement of Bonding Force

Tetrahydrofuran as an organic solvent was applied on to the surface of the first polyester film prepared above. Then, the second polyester film prepared in the same manner was bonded. The bonded film was aged for 1 hour at a load of 2 kg. Thereafter, it was cut in the direction in which the organic solvent was applied by 30 mm and in the perpendicular direction by 90 mm at room temperature, which was measured for the force when the bonded surfaces were detached at a speed of 300 mm/min as the bonding force (gf).

The results of Test Examples 1 and 2 are shown in Table 2 below.

TABLE 2

| | No. of laminations | Clumping fraction (%) | Bonding force (gf) |
|---|---|---|---|
| Ex. 1 | 2 layers | 7.8 | 849 |
| Ex. 2 | | 7.4 | 1,010 |
| Ex. 3 | | 8.0 | 1,048 |
| Ex. 4 | | 7.9 | 1,205 |
| Ex. 5 | | 8.0 | 1,450 |
| Ex. 6 | 3 layers | 5.6 | 450 |
| Ex. 7 | | 4.1 | 604 |
| Ex. 8 | | 6.7 | 690 |
| Ex. 9 | | 5.8 | 871 |
| C. Ex. 1 | Single layer | 10 | 1,820 |

As shown in Table 2, the polyester films prepared in Examples 1 to 9 and the regenerated polyester chips prepared by the process for regenerating a polyester container using the same had a low clumping fraction and excellent bonding force.

The invention claimed is:

1. A process for recycling a polyester container, which comprises:

providing the polyester container and a heat-shrunken polyester film that wraps at least part of the polyester container;

crushing the polyester container and the heat-shrunken polyester film to obtain flakes; and thermally treating the flakes at a temperature of 200° C. to 220° C. for 60 minutes to 120 minutes to produce regenerated polyester chips, wherein when the flakes are thermally treated at a temperature of 200° C. to 220° C. for 60 minutes to 120 minutes, the clumping fraction is 8% or less, the flakes comprise first flakes obtained by crushing the container and second flakes obtained by crushing the heat-shrunken polyester film, the heat-shrunken polyester film comprises a first layer comprising a first resin comprising a diol component and a dicarboxylic acid component; and a second layer laminated on one side of the first layer and comprising a second resin different from the first resin, the second resin is a polyethylene naphthalate-based resin, and the second resin includes a resin having a weight-average molecular weight of less than 10,000 or a resin having a weight-average molecular weight exceeding 12,000.

2. The process for recycling a polyester container of claim 1, wherein the particle size of the first flakes is 0.1 to 25 mm, and the particle size of the second flakes is 0.1 to 25 mm.

3. The process for recycling a polyester container of claim 1, wherein the container comprises polyethylene terephthalate in an amount of 90% by weight or more.

* * * * *